United States Patent [19]
Juso et al.

[11] Patent Number: 5,799,197
[45] Date of Patent: Aug. 25, 1998

[54] INFORMATION REPRODUCING APPARATUS BY WHICH READING OPERATION FROM RECORDING MEDIUM IS CONTROLLED BASED ON AMOUNT OF DATA IN MEMORY

[75] Inventors: Hiromi Juso, Gose; Yukihiko Haikawa; Yukiharu Hosono, both of Higashihiroshima, all of Japan

[73] Assignee: Sharp Kabushiki Kaisha, Osaka, Japan

[21] Appl. No.: 65,773

[22] Filed: May 24, 1993

[30]  Foreign Application Priority Data

Jun. 11, 1992  [JP]  Japan ................. 4-152187

[51] Int. Cl.$^6$ ................................. G06F 13/10
[52] U.S. Cl. ................................. 395/750.05
[58] Field of Search ............... 395/750; 360/19.1

[56]  References Cited

U.S. PATENT DOCUMENTS

| | | |
|---|---|---|
| 4,233,666 | 11/1980 | Walberg et al. ............... 395/750 |
| 4,587,573 | 5/1986 | Odaka . |
| 4,747,041 | 5/1988 | Engle et al. ............... 395/750 |
| 5,113,383 | 5/1992 | Amemiya et al. ............ 369/33 |
| 5,167,024 | 11/1992 | Smith et al. ............... 395/375 |
| 5,179,493 | 1/1993 | Imanishi ................... 361/91 |

FOREIGN PATENT DOCUMENTS

| | | |
|---|---|---|
| 0 463 183 A1 | 1/1992 | European Pat. Off. . |
| 3-40269 | 2/1992 | Japan . |

Primary Examiner—Ayaz R. Sheikh
Assistant Examiner—P. R. Myers
Attorney, Agent, or Firm—Nixon & Vanderhye P.C.

[57]  ABSTRACT

Data read out from a disk is once written in a memory, and data is read out from memory at a rate lower than the writing rate. In a power saving mode, when data in the memory reaches full capacity, the power to a pickup, an RF amplifier, a decoder/signal processing circuit, a servo circuit, and a driver circuit for driving a spindle motor and a sending motor is turned off, thereby temporarily stopping data reading from the disk. Reading from the disk and writing into the memory resumes when power is restored before the memory is completely read out.

15 Claims, 3 Drawing Sheets

INFORMATION REPRODUCING APPARATUS BY WHICH READING OPERATION FROM RECORDING MEDIUM IS CONTROLLED BASED ON AMOUNT OF DATA IN MEMORY

BACKGROUND OF THE INVENTION

1. Field of the Invention

The present invention relates generally to information reproducing apparatuses, and more specifically, to an information reproducing apparatus such as a mini disk apparatus (hereinafter referred to as MD apparatus) for reading out and time base expanding information from a recording medium such as a disk which digitally stores information data such as audio sound data by means of time base compression, and reproducing the data.

2. Description of the Background Art

An MD apparatus reads out data from a disk in which time base-compressed audio sound data is digitally stored and time base-expands the read out data, and reproduces the data by digital/analog conversion. An MD apparatus usually reads out audio data from a disk at a rate of about 1.4 Mbit per second and time base expands the data at a rate of about 0.3 Mbit per second. Accordingly, in this MD apparatus, the difference between the rate of reading out data using a pickup and the rate of sending out the data to be reproduced by time base-expansion should be absorbed. More specifically, time base-compressed audio sound data read out from the disk is once stored in a semiconductor memory and then read out for reproduction at a rate of about 0.3 Mbit per second.

Also in this MD apparatus, taking advantage of the difference between the data reading rate by the above-described pickup and the sending out rate of data to be reproduced by means of time base-expansion, time base-compressed audio data read out from the disk is always stored in the semiconductor memory in more than a prescribed amount so that if the pickup is out of a correct track due to disturbance such as vibration, a reproduced sound is not discontinued by returning the pickup to the correct track.

The above-described semiconductor memory is a so-called shock proof memory, and in a conventional MD apparatus usually a 1 Mbit DRAM is utilized. The shock proof memory as described above has part of its capacity utilized as a WORK RAM for absorbing the difference in the data transfer rates of data input and output to the memory and part of the capacity for protecting against the shock described above or track jump (for the shock proof).

In other words, if the shock proof memory is a 1 Mbit DRAM, the difference in the processing rates of reading out and time base-expansion of audio data from the disk is about 1.1 Mbit per second. After reading of audio data from the disk is initiated, the shock proof memory is filled up to its memory capacity in about 1 second (1 Mbit/1.1 Mbit·s$^{-1}$), and data for about three seconds as reproducing time (1 Mbit/0.3 Mbit·s$^{-1}$) is stored. Therefore, when the shock proof is filled up to its memory.capacity, for a prescribed time period for example 1 second, audio data read out from the disk is not stored in the shock proof memory (so called idle reading of the disk is performed), and only reading of data from the memory is performed at a rate of about 0.3 Mbit per second. Thus, an empty region is produced at part of the capacity of the shock proof memory. Audio sound data once again read out from the disk is sequentially stored in the empty space, and at the point at which the shock proof memory is filled up to its memory capacity, idle reading from the disk is once again performed for a prescribed time period (in other words for about 1 second). The same operation is repeated from thereon.

Thus, audio sound data stored in shock memory for about two seconds before reproducing is always secured in the shock proof memory for shock proof.

In the case of a portable MD apparatus easy to carry, when the apparatus is carried for use, batteries are usually used as a power supply. In this case, since a duration for continuous use without exchange of batteries is limited, a portable MD apparatus desirably has a structure suitable for use for a long period of time keeping power consumption as low as possible.

However, in the above-described conventional structure, after the amount of stored audio sound data in the shock proof memory reaches the full memory capacity, idle reading from the disk is performed and therefore power is wasted, thereby reducing the duration for continuous use.

SUMMARY OF THE INVENTION

It is an object of the invention to improve economical aspect in an information reproducing apparatus.

Another object of the invention is to reduce current consumption in an information reproducing apparatus.

A still further object of the invention is to keep economical aspect and reliability compatible in an information reproducing apparatus.

In order to achieve the above-described objects, an information reproducing apparatus according to one aspect of the invention has a stored information reading device for reading out information data from a recording medium in which time base-compressed information data is digitally stored, and a memory having a region formed to store the information data read out by the stored information reading device, and reproduces information by writing the information data read out by the stored information reading device once in the memory, reading out the information data from the memory at a rate lower than the writing rate, and time base-expanding the information data.

The information reproducing apparatus includes a switch for switching between the on and off of supply of power to the stored information reading device, and a control device for controlling the switching operation of the switch so that supply of power is not conducted to the stored information reading device when the amount of stored information data in the memory reaches the full memory storage capacity, and the control device controls the switching operation of the switch to resume supply of power to the stored information reading device when the amount of stored information data in the memory is a prescribed amount or smaller, so that writing of information data to the memory is resumed before information data in the memory becomes empty.

In the above-described information reproducing apparatus, information data read out from the recording medium by the stored information reading device is once written in the memory, and read out for reproduction from the memory at a rate lower than the writing rate. Accordingly, due to the difference between the writing rate and reading rate, information data is accumulated in the memory. When the amount of information data stored in the memory reaches a full memory storage capacity, the switch is switched by the control device so that supply of power to the stored information reading device is cut off. Thus, storing of information data to the memory is interrupted, and only reading of data is performed. In this case, as opposed to the idle reading, since supply of power to the stored information reading device is stopped, power consumption by the apparatus is reduced as compared to the case of usual reproducing operation.

When reproduction is performed in the above-described state, although the amount of information data stored in the memory decreases with time and the memory becomes empty after a prescribed time period, the control device controls the operation of the switch so that supply of power to the stored information reading device is resumed when the amount of information data stored in the memory is a prescribed amount or smaller, so that writing of information data to the memory is resumed before the memory becomes empty. Thus, information data is once again accumulated in the memory and therefore the reproducing operation is not interrupted.

In order the achieve the above-described objects, an information reproducing apparatus according to another aspect of the invention has a stored information reading device for reading out information data from a recording medium in which time base-compressed information data is digitally stored, a memory having region formed to store the information data read out by the stored information reading device, a writing device for writing the information data read out by the stored information reading device in the memory, a reading device for reading out information data from the memory at a rate lower than the writing rate of the writing device, and a control device for adjusting the amount of stored information data held in the memory by controlling the operation of the writing device, and reproduces information by time base-expanding the information data read out by the reading device.

The apparatus includes a switch for switching the on and off of supply of power to the stored information reading device, and a mode selection device for selecting a mode to set between a first mode and a second mode, the control device controls the switching operation of the switch to stop supply of power to the stored information reading device when the amount of information data stored in the memory reaches a full memory storage capacity, and to resume supply of power to the stored information reading device and controls the operation of the writing device to resume writing information data to the memory when the amount of information data stored in the memory is a first prescribed amount or smaller when the first mode is selected by the mode selection device, while controls the operation of writing device so that information data for shock proof in the memory is always held in a second prescribed amount or larger when the second mode is selected by the mode selection device.

The information reproducing apparatus as described above has the mode selection device for selecting between the first mode and second mode. When the first mode is selected by the mode selection device, the on and off of power supply of the stored information reading device is repeated, and power consumption at the time of reproduction is reduced as a result. More specifically, when the first mode is selected, the memory can be used for the purpose of power saving permitting reduction of power consumption. Meanwhile, when the second mode is selected by the mode selection device, the control device controls the operation of the writing device so that information data for shock proof is always held in the memory in a prescribed amount or larger. More specifically, when the second mode is selected, the memory is used for shock proof.

As described above, the memory can be used either for power saving or shock proof depending upon the result of selection by the mode selection device. For example, when an information reproducing apparatus is carried in use utilizing batteries for the power supply, use for a long period of time is permitted by selecting the first mode. Meanwhile, if the apparatus is not used as portable and AC100V is used as the power supply, for example, the confusion of reproduced information due to disturbance or the like can be prevented by selecting the second mode.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
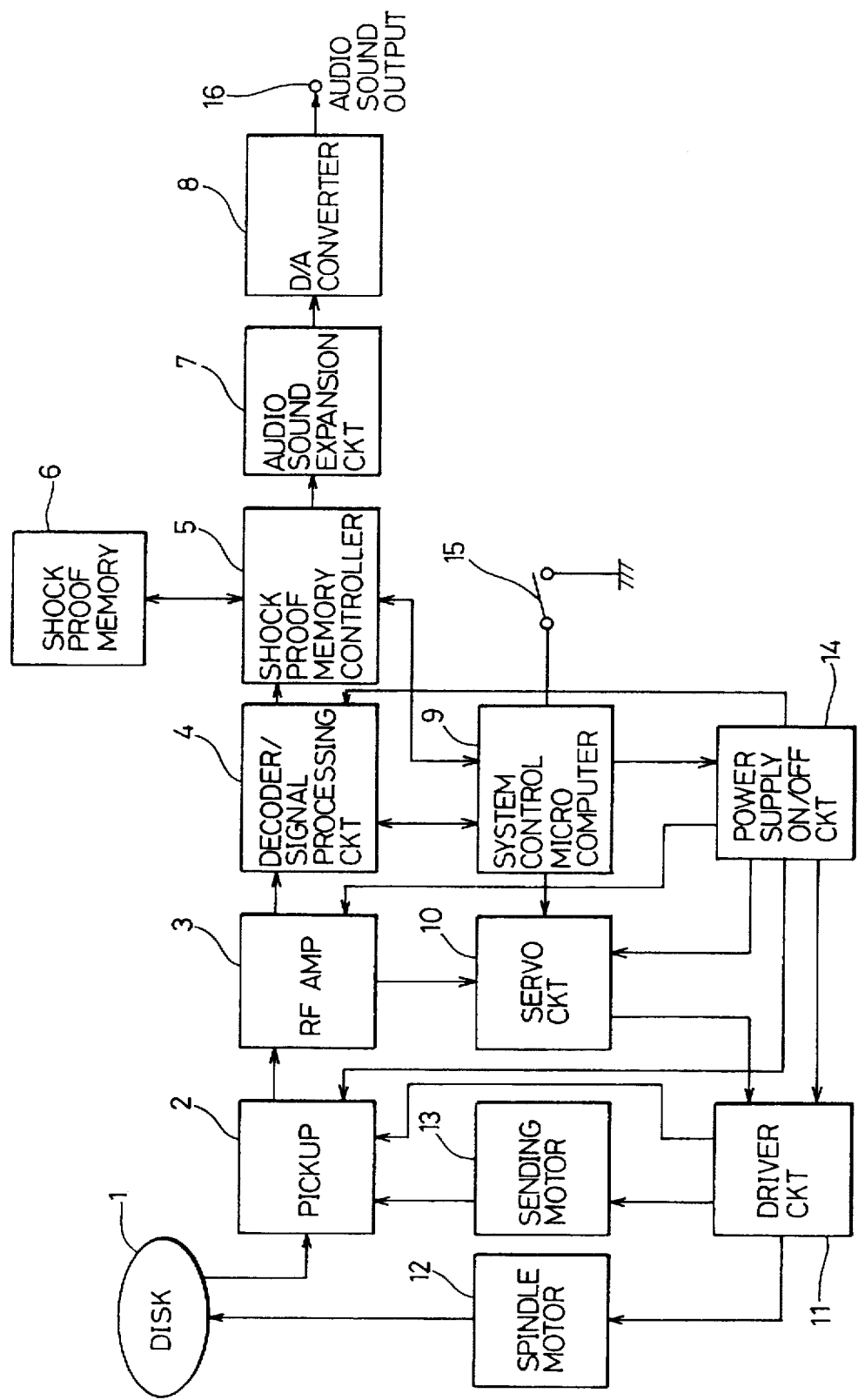
FIG. 1 is a block diagram showing the structure of the essential part of an MD apparatus according to one embodiment of the invention.
Figure 2:
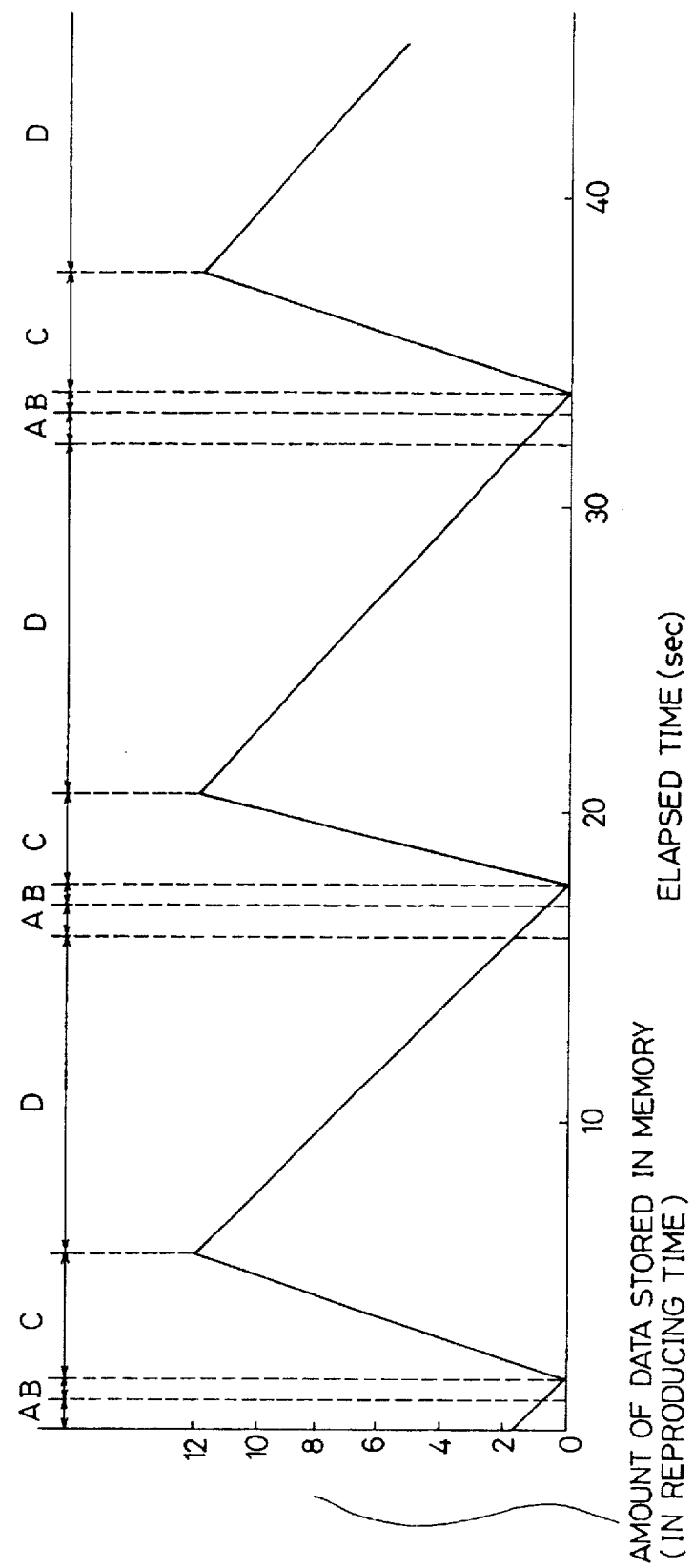
FIG. 2 is a graphic representation showing change with time in the amount of data stored in a shock proof memory when a power saving mode is set.

Description of one embodiment of the invention follows in conjunction with FIGS. 1 and 2.

An MD apparatus as an information reproducing apparatus according to the embodiment as illustrated in FIG. 1 includes a pickup 2, an RF amplifier 3, a decoder/signal processing circuit 4, a servo circuit 10, a driver circuit 11, a spindle motor 12, and a sending motor 13 which constitute stored information reading means for causing audio sound data to be read by pickup 2 from a disk (recording medium) 1 in which time base-compressed audio sound data (information data) is digitally stored.

At the time of reproduction, disk 1 is rotated by spindle motor 12 driven by driver circuit 11, and pickup 2 is moved in the radial direction of disk 1 by sending motor 13 driven by driver circuit 11. Audio sound data stored in disk 1 is read out by pickup 2. The audio sound data read out by pickup 2 is amplified in RF amplifier 3 and sent to decoder/signal processing circuit 4.

RF amplifier 3 produces servo control signals including a focus error signal and a tracking error signal, based on the audio sound data read out from pickup 2 and outputs the resultant signals to servo circuit 10. Servo circuit 10 controls driver circuit 11 to perform servo control of focus, tracking, and spin in response to the servo control signal from RF amplifier 3 in response to a control signal from a microcomputer 9 for system control. Driver circuit 11 drives pickup 2, sending motor 13, and spindle motor 12 in response to the control signal from servo circuit 10.

Decoder/signal processing circuit 4 performs demodulation and then signal processing such as correction of errors on the signal amplified in RF amplifier 3 and sends the resultant signal to a shock proof memory controller (hereinafter referred to as memory controller) 5 which includes memory writing means and memory reading means.

Memory controller 5, as the writing means, writes the signal sent from decoder/signal processing circuit 4 sequentially in shock proof memory 6 for storage. In this embodiment, a 4 Mbit DRAM is used for shock proof memory 6.

The memory reading means of memory controller 5 reads out audio sound data stored in shock proof memory 6 at a rate of about 0.3 Mbit per second from shock proof memory 6, and sends the read out data to audio sound expansion circuit 7. Audio sound expansion circuit 7 subjects the compressed audio data to a time base-expansion process according to a prescribed format and sends the resultant time base expanded data to a D/A converter 8. D/A converter 8 converts the input digital signal into an analog signal, i.e., an audio sound signal. The audio sound signal is output as an audio sound from an output terminal 16.

It is noted that pickup 2 reads out audio sound stored in disk 1 at a rate of about 1.4 Mbit per second, while audio sound expansion circuit 7 de-compresses time base-compression at a rate of about 0.3 Mbit per second. In other words, the difference in the processing rates of the disk read out processing and the time base expansion processing of audio data read from disk 1 is about 1.1 Mbit per second. Due to the difference in the processing rates, the disk data is accumulated in shock proof memory 6 before de-compressing. In this embodiment, since the capacity of shock proof memory 6 is 4 Mbits, shock proof memory 6 is filled to its memory capacity in about 4 seconds (4 Mbits/1.1 Mbits·s$^{-1}$) after data reading from disk 1 by pickup 2 is initiated about 12 seconds of data (4 Mbits/0.3 Mbit·s$^{-1}$), measured in terms of in reproducing time based on the slower 0.3 Mbit/sec readout rate, is stored in the memory 6.

When audio sound data fills up shock proof memory 6 to its full capacity as described above, different reproducing operations are performed thereafter depending upon which mode the MD apparatus is set: either a first power saving mode or a second shock proof mode. The shock proof mode is a conventionally practiced with shock proof memory 6 being used for shock proofing. The power saving mode does not use shock proof memory 6 for shock proofing, but instead for the purpose of reducing power consumption. Each of the above-described modes will be described in detail.

More specifically, the MD apparatus includes the above-described pickup 2, RF amplifier 3, decoder/signal processing circuit 4, servo circuit 10, driver circuit 11 for driving spindle motor 12 and sending motor 13, and a power supply ON/OFF circuit 14 as for switching between the supply of power on and off. Power supply ON/OFF circuit 14 is controlled by microcomputer 9. A power saving switch (e.g., a manual switch to function as the mode selection means) 15, which can be manually set to the power saving mode, is connected to microcomputer 9.

When power saving switch 15 is ON, the apparatus is set to the power saving mode. When power saving switch 15 is OFF, microcomputer 9 functions as automatic mode selection means for automatically selecting one of the modes. More specifically, microcomputer 9 selects the power saving mode when it determines that capacity necessary for shock proof can be small, because there exists few errors with a long error cycle and fluctuation in the servo voltage of servo circuit 10 is small. Alternatively, microcomputer 9 selects the shock proof mode when it determines that the capacity necessary for shock proofing should be large cause for example, many errors exist within a short error cycle or there is fluctuation in the servo voltage of servo circuit 10 is large.

Now, description will be provided on the case in which the shock proof mode is set.

When audio sound data is stored in shock proof memory 6 to full capacity, after a prescribed time period, microcomputer 9 controls memory controller 5 so that shock proof memory 6 does store audio sound data read out from disk 1 by pick up 2. This operation is referred to as "idle reading" disk 1. Accordingly, during this idle reading period, only data from shock proof memory 6 is read at a rate of about 0.3 Mbit per second. Therefore an empty memory region is produced in part of the capacity of shock proof memory 6 during this time period. After reading from memory 6 is performed for a prescribed time period, microcomputer 9 controls memory controller 5 to make pickup 2 jump to the track of disk 1 reached just before the memory 9 had reached its full capacity and to have audio sound data read out from disk 1 at that track stored in shock proof memory 6. Thereafter, when audio sound data is once again stored in shock proof memory 6 up to full capacity, the memory controller 5 once again performs idle reading from the disk for a prescribed time period, and then the same series of operations are repeated thereafter. Thus, data for shock proof is always secured in shock proof memory 6.

Now, description will be provided on the case in which the apparatus is set to the power saving mode.

When audio sound data is stored in shock proof memory 6 up to full capacity, microcomputer 9 controls power supply ON/OFF circuit 14 to turn off the power supply (cut off supply of power) of pickup 2, RF amplifier 3, decoder/signal processing circuit 4, servo circuit 10, and driver circuit 11 for driving spindle motor 12 and sending motor 13. Thus, the idle reading of audio sound data from disk 1 to shock proof memory 6 is interrupted. Only data from shock proof memory 6 is read at a rate of about 0.3 Mbit per second, and an audio sound signal is reproduced. In this case, as opposed to idle reading from disk 1, since the power supplies of the elements of the stored information reading means are turned off, power consumption by the apparatus is reduced as compared to usual reproduction.

When reproduction is performed in the above-described state, shock proof memory 6 will be empty after a prescribed time period (in other words about 12 seconds). Microcomputer 9 controls power supply ON/OFF circuit 14 so as to turn on (resume supply of power) the power supplies of pickup 2, RF amplifier 3, decoder/signal processing circuit 4, servo circuit 10, driver circuit 11 for driving spindle motor 12 and sending motor 13. Thus, reading of audio sound data from disk 1 is resumed, audio sound data is once again stored in shock proof memory 6, and then reading is performed therefrom, so that reproduction operation is not interrupted.

As described above, in the power saving mode, the MD apparatus repeats the operation of turning off the power supplies of the elements of the stored information reading means when audio data is stored in shock proof memory 6 to its full capacity, and turning on the power supplies of the elements of the stored information reading means before the memory 6 becomes empty, thereby reducing power consumption by the apparatus.

Elapsed time relative to the amount of data stored in shock proof memory 6 (in terms of reproduction time) when the apparatus is set to the power saving mode is illustrated in FIG. 2.

In FIG. 2, the period represented by A covers the period during the power saving state (more specifically the power supplies of the elements of the stored information reading means are off), where the power supplies of the elements of the stored information reading means are turned back on, i.e. spindle motor 12 rotates, a laser beam is emitted from pickup 2, and rising of focus, etc. The period represented by B is the period where tracking of the pickup 2 is performed in preparation for resumed reading of data from disk 1. The period represented by C is the period for reproducing an audio sound signal by reading out audio data from disk 1, and only during this period data is stored in shock proof memory 6. The period represented by D is the period in which the elements of the stored information reading means (pickup 2, RF amplifier 3, decoder/signal processing circuit 4, servo circuit 10, and driver circuit 11 for driving spindle motor 12 and sending motor 12) are turned off.

Consider that the average power consumption at the time of reproduction in the power saving mode is P1, power consumption at the time of rising, i.e. from the elements of the stored information reading means being turned back on from the power saving state until reading data from disk 1 begins again, (in other words period A+period B) is $P_s$, power consumption at the time of data reading from disk 1 (in other words period C) is $P_{on}$, and power consumption in the power saving period (in other words period D) is $p_{off}$ ($P_{off}<P_{on}$). If the duration of period A is 1.0 second, the duration of period B 0.7 second, the duration of period C 4.0 seconds, and the duration of period D 10.3 seconds, the average power consumption $P_1$ is given by the following equation (1) under the above-described time distribution conditions:

$$P_1=1.7P_s/16+4P_{on}/16+10.3P_{off}/16 \quad (1)$$

Meanwhile, if the average power consumption at the time of reproduction in the shock proof mode is $P_2$, the following equation (2) holds:

$$P_2=P_{on} \quad (2)$$

When $P_1<P_2$, in other words the following equation (3) is established from equations (1) and (2), $$(1.7P_s+10.3P_{off})/16<0.75P_{on} \quad (3)$$

Power consumption is thus reduced in the power saving mode in accordance with equation (3) can be achieved in a usual MD apparatus for $P_s$=3.0 W, $P_{on}$=2.0 W, $P_{off}$=1.5 W, and the conditions satisfy equation (3). Under the conditions, the average power consumption $P_1$=1.78 W according to equation (1), and therefore power consumption can be reduced by about 0.22 W at the time of reproduction in the power saving mode.

The power consumption $P_s$ at the time of rising is higher than the power consumption $P_{on}$ at the time of data reading from disk 1, and therefore if the capacity of the shock proof memory is too small, sufficient reduction of power consumption can not be achieved with the power saving period being too short, or conversely the power consumption sometimes increases. Accordingly, it is necessary to select a capacity for the shock proof memory depending upon the conditions of $P_s$, $P_{on}$, and $P_{off}$. As in the embodiment, the use of a 4 Mbit shock proof memory can effectively reduce power consumption.

It is noted that although in the embodiment, the 4 Mbit shock proof memory is utilized, but the capacity of shock proof memory is not limited to this, and the use of a memory with a larger capacity can further reduce power consumption.

Figure 3:
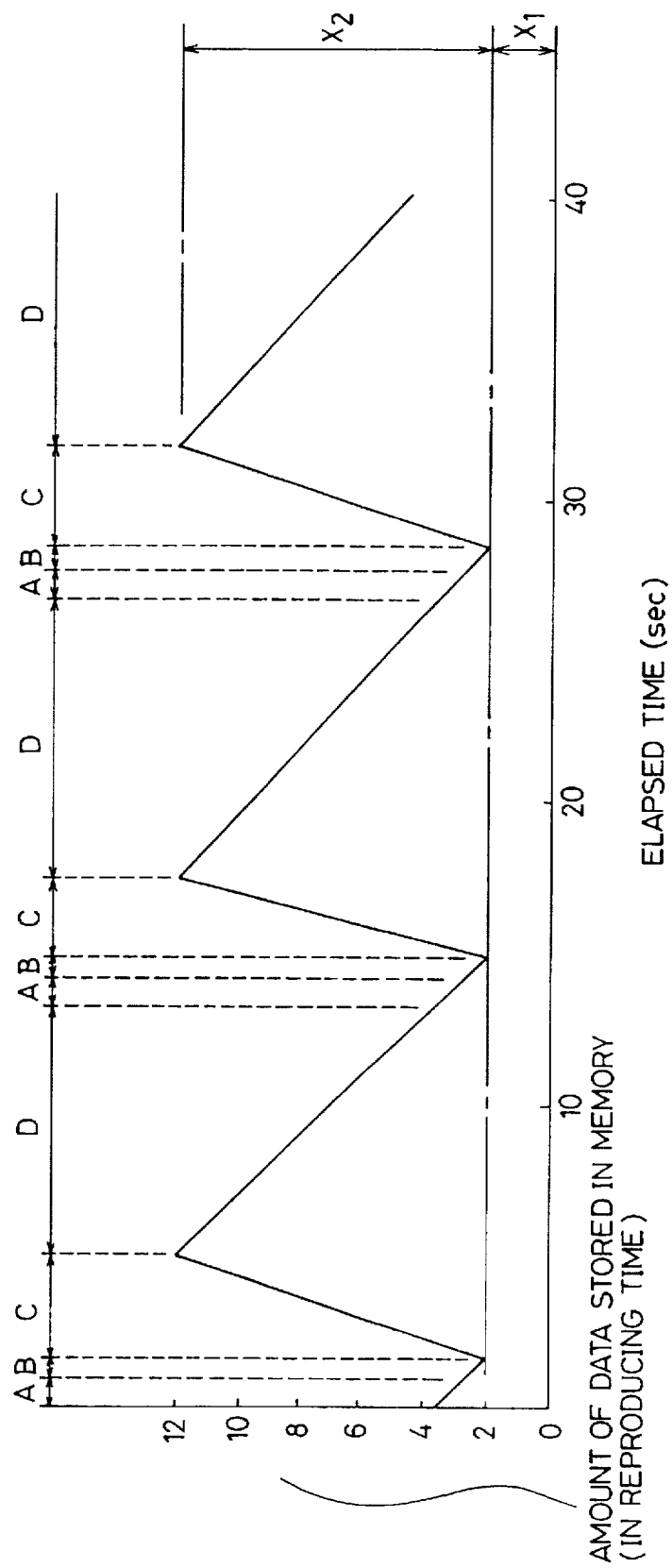
FIG. 3 is a graphic representation showing change with time in the amount of data stored in the shock proof memory when part of the capacity of the shock proof memory is utilized for the purpose of shock proof and the remaining part for the purpose of power saving in the MD apparatus shown in FIG. 1.

Furthermore, when a shock proof memory with 16 Mbits or larger, as illustrated in FIG. 3, part of the capacity may be used for shock proof and the remaining part for power saving.

More specifically, depending upon the state of the power saving in the period represented by D, the amount of data stored in the shock proof memory decreases, and when the amount of stored data is $X_1$, reading operation is resumed and data is written in the shock proof memory. Thus, the part of the capacity $X_1$ is utilized for shock proof, and the remaining capacity $X_2$ is used for power saving, so that the reliability and the economical aspect of the apparatus are kept compatible.

Furthermore, microcomputer 9 may arbitrarily divide the capacity of the shock proof memory for shock proof and for power saving depending upon the amount of errors, its cycle and fluctuation in servo voltage.

In the embodiment, power saving switch 15 is utilized and therefore the user can arbitrarily select a mode to set depending upon a purpose. For example, when the MD apparatus is carried in use using batteries for the power supply, shock proof memory 6 is always used for power saving by selecting the power saving mode operating power saving switch 15, allowing use in a long period of time. Meanwhile, if AC100V is used as the power supply, for example, since the duration of use is not limited by the power supply, dropouts in sounds due to disturbance, etc. can be prevented by selecting the shock proof mode.

Conventionally, even when there exists few errors, data for shock proof is always held in shock proof memory 6 in more than a prescribed amount. In contrast, in the embodiment, shock proof memory 6 can be used for power saving if the amount of error is small. Accordingly, reduction of power consumption can be achieved while maintaining the state in which dropouts in sounds due to disturbance or the like are less frequently experienced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information reproducing apparatus having information handling means for reading out information data from a recording medium in which time base-compressed information data is digitally stored, and storage means having a region formed to store the information data read out by said information handling means, for writing the information data read out by said information handling means once in said storage means, reading out information data from the storage means at a rate lower than the writing rate, and reproducing information by time base-expanding the information data, comprising:

switching means for switching power to said information handling means; and control means for controlling said switching means so that power to said information handling means is removed when the amount of information data stored in said storage means reaches full storage capacity of the storage means, wherein said control means controls said switching means to restore power to said information handling means when the amount of information data stored in said storage means is a prescribed amount or smaller, thereby resuming writing of information data to said storage means before said storage means becomes empty.

2. An information reproducing apparatus having stored information reading means for reading out information data from a recording medium in which time base-compressed information data is digitally stored, storage means having a region to store the information data read out by said stored information reading means, writing means for writing the information data read out by said stored information reading means in said storage means, memory reading means for reading out information data from said storage means at a rate lower than the writing rate of said writing means, and control means for adjusting the amount of information data stored and held in said storage means and for reproducing information by time base-expanding the information data read out by said memory reading means, comprising:

switching means for switching power to said stored information reading means; and mode selection means for selecting one of a first mode and a second mode, wherein said control means controls said switching means so that power to said stored information reading means is removed when the amount of information data stored in said storage means reaches full storage capacity of said storage means, and controls said switching means to restore power to said stored information reading means when the amount of information data stored in said storage means is a first prescribed amount or smaller, controls the operation of said writing means to resume writing of information data to said storage means when the first mode is selected by said selection means, and controls the operation of said writing means so that information data is held in said storage means for a shock resistant time period necessary for the information reproducing apparatus to compensate for a physical disturbance in reading out information data from the recording medium when the second mode is selected by said selection means.

3. An information reproducing apparatus as recited in claim 2, wherein said selection mode includes a manual switch for selecting one of the first and second modes.

4. An information reproducing apparatus as recited in claim 2, wherein said mode selection means includes automatic selection means for automatically selecting one of the first and second modes.

5. An information processing apparatus, comprising:

information storage means for storing information data;

information writing means for writing read out information in said information storage means at a first rate;

information reading means for reading out said written information data from said information storage means at a second rate lower than said first rate;

power supply means for supplying power for activating said information writing means; and control means for controlling supply of power by said power supply means to said information processing apparatus based on an amount of information data stored in said information storage means.

6. An information processing apparatus as recited in claim 5, wherein said control means controls said power supply means to reduce said supply of power, when information data stored in said information storage means reaches the full storage capacity of said information storage means.

7. An information processing apparatus as recited in claim 6, wherein after said supply of power is reduced, said control means controls said power supply means to restore said supply of power when information data stored in said information storage means reaches a prescribed amount.

8. A method of processing information, comprising:

(a) writing data in a memory at a first rate while reading out data from said memory at a second rate lower than said first rate;

(b) removing power necessary for said writing when an amount of data stored in said memory reaches a first prescribed amount;

(c) restoring said power when the amount of data stored in said memory reaches a second prescribed amount smaller than said first prescribed amount; and (d) repeating steps (a)–(c).

9. A method of processing information as recited in claim 8, wherein said first prescribed amount is a storage capacity of said memory.

10. A method of processing information as recited in claim 9, wherein said second prescribed amount is 0.

11. A method of processing information as recited in claim 9, where said second prescribed amount is greater than 0.

12. An information reproducing apparatus, comprising:

a memory for storing data;

a memory controller for writing data into the memory at a first rate and reading data from the memory at a second rate faster than the first rate;

a power supply; and a control circuit for controlling an amount of power provided by the power supply and consumed by the information reproducing apparatus based on an amount of data stored in the memory to be read out.

13. The apparatus in claim 12, further comprising:

disk storage, and a disk controller for reading data stored on the disk storage at the first rate, wherein the control circuit removes power from the disk controller when the memory has more than a predetermined amount of data to be read out by the memory controller.

14. The apparatus in claim 13, wherein the predetermined amount depends on a capacity of the memory.

15. The apparatus in claim 14, wherein the control circuit uses a part of the memory capacity to protect the data stored in the memory and another part of the memory capacity to reduce power consumption.

* * * * *